United States Patent
Hassan et al.

(10) Patent No.: US 6,713,901 B2
(45) Date of Patent: Mar. 30, 2004

(54) LINEAR ELECTROMAGNETIC ZERO NET MASS JET ACTUATOR

(75) Inventors: Ahmed A. Hassan, Mesa, AZ (US); David B. Domzalski, Gilbert, AZ (US); Bruce Dean Charles, Mesa, AZ (US); Ram Damaraju JanakiRam, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/098,107

(22) Filed: Mar. 14, 2002

(65) Prior Publication Data

US 2003/0173832 A1 Sep. 18, 2003

(51) Int. Cl.[7] ............................................. H02K 41/00

(52) U.S. Cl. ........................................ 310/12; 381/396

(58) Field of Search ...................... 310/12, 13; 381/396

(56) References Cited

U.S. PATENT DOCUMENTS

| | | | |
|---|---|---|---|
| 4,327,257 A | * | 4/1982 | Schwartz .................... 179/115 |
| 5,813,625 A | | 9/1998 | Hassan et al. |
| 5,938,404 A | | 8/1999 | Domzalski et al. |

OTHER PUBLICATIONS

Hassan, A.A., and Munts, E., Transverse and Near Tangent Synthetic Jets for Aerodynamic Flow Control, paper 2000–4334, presented at the 15th AIAA Applied Aerodynamics Conference, Denver, CO, Aug. 14–17,2000.

Nagib, H., Wygnanski, I., and Hassan, A.A., Effective Flow Control for Rotorcraft Applications at Flight Mach Numbers–Invited, paper 2001–2974, presented at the 31st AIAA Fluid Dynamics Conference and Exhibit, Anaheim, CA, Jun. 11–14,2001.

* cited by examiner

Primary Examiner—Nicholas Ponomarenko
Assistant Examiner—Iraj A. Mohandesi
(74) Attorney, Agent, or Firm—Harness Dickey & Pierce P.L.C.

(57) ABSTRACT

A linear electromagnetic zero net mass jet (ZNMJ) actuator incorporating a pair of permanent magnets. The magnets are arranged such that an air gap is formed therebetween and further such that opposite poles of the magnets are arranged on opposite sides of the air gap. This concentrates the flux field across the air gap. A coil is disposed in the air gap. The coil is attached to a diaphragm which acts as a piston. When an electric current is applied to the coil, the flux field across the air gap causes a rapidly oscillating motion of the diaphragm. The actuator provides an increased rate of displacement of the piston as compared to single magnet ZNMJ actuators, and thus provides a higher momentum output across a broad frequency and voltage spectrum than conventional ZNMJ actuators using a single magnet.

15 Claims, 4 Drawing Sheets

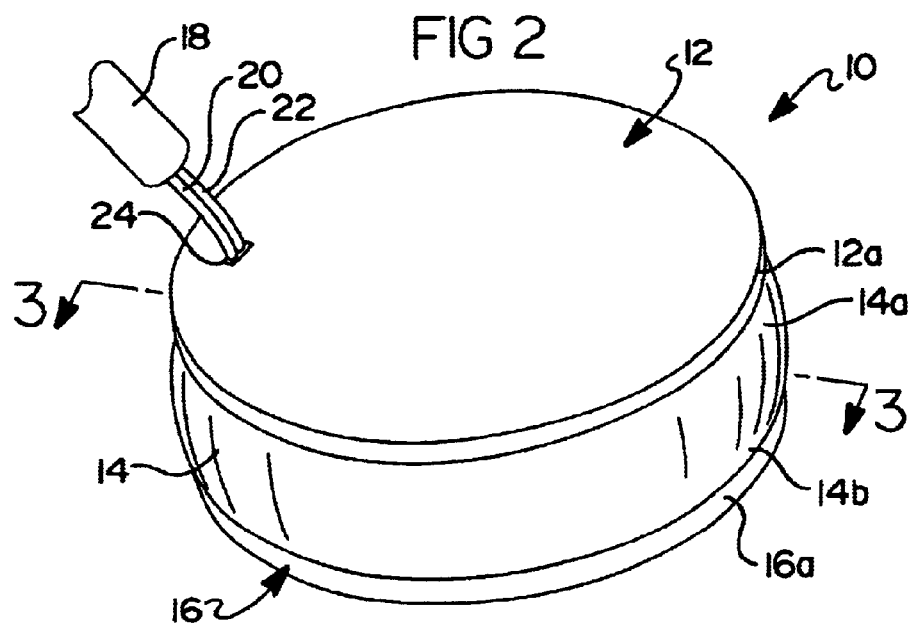
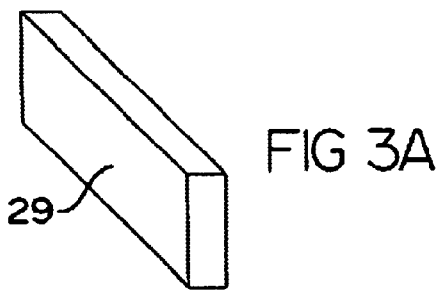
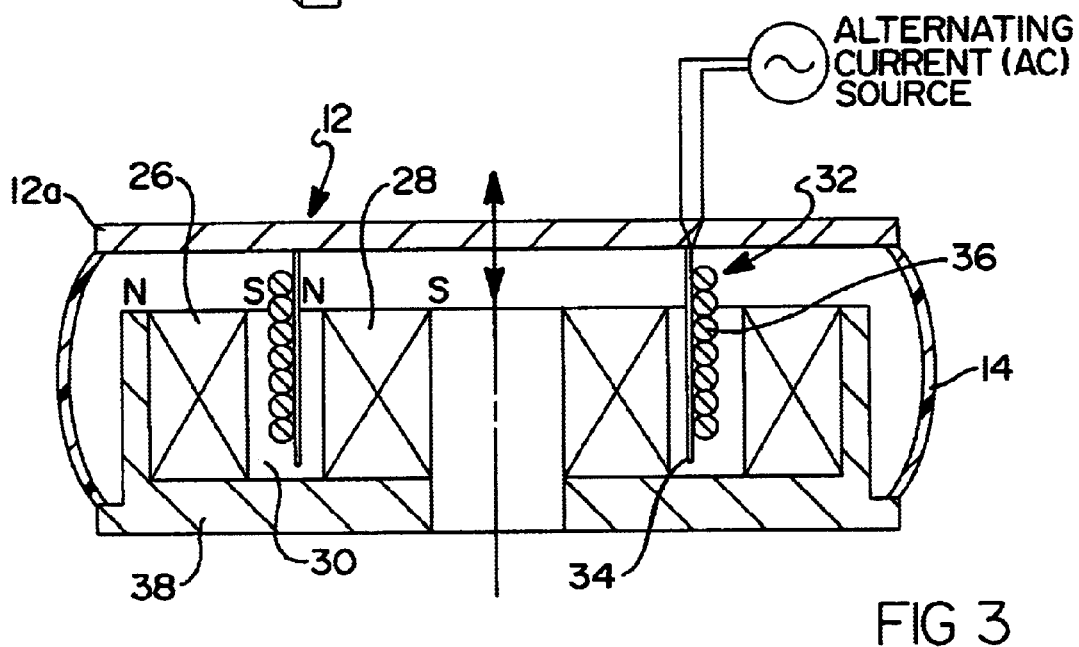

LINEAR ELECTROMAGNETIC ZERO NET MASS JET ACTUATOR

FIELD OF THE INVENTION

This invention relates to actuators, and more particularly to the design of a linear electromagnetic zero net mass jet (ZNMJ) actuator for providing improved output velocity of jet air pulses therefrom.

BACKGROUND OF THE INVENTION

All modern military and commercial aircraft/rotorcraft include aerodynamic lifting surfaces that can significantly impact the performance of the entire vehicle. In general, the aerodynamic efficiency of any lifting surface, regardless of the class of vehicle, is dependent on the lift-to-drag ratio of that surface. Recent wind tunnel tests conducted at the Boeing Company have demonstrated that significant improvements in this ratio (through increases in lift and reductions in drag) can be achieved with the use of a zero net mass jet (ZNMJ) actuator. Specifically, the tests demonstrated that the percent improvement is directly related to the momentum output of the ZNMJ actuator and its capability to perform in conditions representative of those encountered in realistic flight situations. Consequently, a high-momentum output ZNMJ actuator having an expanded performance envelope is one that will guarantee additional aerodynamic Improvements. Such aerodynamic improvements involve improving the range of commercial transports for a given amount of fuel, increasing the maneuverability of fighter aircraft and increasing the lifting capability of heavy lift aircraft/rotorcraft.

The recent wind tunnel experiments described above are supported by results from numerical simulations that indicate that the aerodynamic benefits resulting from the use of an electromagnetic ZNMJ actuator are directly proportional to the momentum output of the actuator (or equivalently, to the actuator's maximum output velocity). These benefits, be they stall/post-stall, lift enhancement and/or drag reduction, have been found to be a result of preventing/suppressing separation of the boundary layer due to periodic injection of momentum into the flow.

In general, current ZNMJ actuator designs suffer from performance degradation manifested by low-momentum output when such actuators are operated at high frequencies (200 Hz–600 Hz) and/or, for a given frequency, when operated at a safe input voltage. These two limitations restrict the class of practical problems that can benefit from the application of active flow control (AFC). For example, for an aircraft flying at low to high subsonic free stream Mach numbers (e.g. 0.20–0.50), enhancement of the aerodynamic lift on the wing, and/or the reduction of airframe drag, are known to demand high momentum output if measurable aerodynamic benefits are to be expected. Unfortunately, to date, these benefits have not been realized due to the performance limitations of present day ZNMJ actuators. The ideal ZNMJ actuator would provide consistent performance (i.e., momentum output) over a wide range of operating voltages, frequencies and actuator geometric parameters.

Referring to FIG. 1, a typical prior art ZNMJ actuator is shown. As perceived by an observer standing next to the orifice-like port 1, periodic flow out of and into the cavity 2 is seen. The external jet-like flow 3 results from the entrainment of the surrounding ambient fluid 4. Typically, the diaphragm (or piston) of a ZNMJ actuator 5 is activated electrostatically, electromagnetically, or through the use of a piezoelectric material with frequencies that span 1–10 KHz. In short, the mechanics of the jet resemble those associated with the outward and inward flows observed when one moves a piston forward (i.e., towards the orifice) and backward (i.e., away from the orifice) in a cylinder having a single exit port. An electromagnetic ZNMJ actuator functions in a very similar way. Here the motion of the piston is emulated with a rigid diaphragm that oscillates 6 inside a cavity 2 by means of an electromagnet to duplicate the repeated forward and backward motions of the piston inside the cylinder 7.

The performance of a typical ZNMJ actuator is characterized by the measured jet 3 momentum (or equivalently, the maximum external velocity) a small distance away from the orifice-like exit port 1. With no exception, for a given voltage, all ZNMJ actuator designs experience rapid degradation in momentum output at high oscillation frequencies. For full scale aerospace vehicles, effective flow control for providing measurable aerodynamic benefits, be it increasing the lift of an airfoil/wing/rotor or reducing the drag of an airfoil/wing/rotor/fuselage/airframe, at realistic flight Reynolds numbers and free stream Mach numbers, demand higher momentum levels at low to moderate frequencies (e.g., 50–200 Hz).

It will also be appreciated that the momentum output of a ZNMJ actuator is a function of the applied voltage to the actuator. In principal, the actuator can achieve higher momentum (or output velocities) through higher imposed voltages. However, since the actuator is an electrical device, its safe operation is dictated by the maximum allowable power which, indirectly, translates into a "safe" operating voltage and/or a "safe" operating current. Typically, this operating voltage is 10–15% lower than that based on the maximum power requirement.

In view of the foregoing, it is a principal object of the present invention to provide a new ZNMJ actuator design which can provide a higher momentum (i.e., velocity) output for a given input voltage. It is a further object of the present invention to provide an electromagnetic ZNMJ actuator which functions to provide an even higher momentum output over a given frequency range than previously developed ZNMJ actuators, and which does so without significantly increasing the weight and volume of the actuator, and without complicating the construction of the actuator.

SUMMARY OF THE INVENTION

The present invention is directed to a zero net mass jet (ZNMJ) actuator in accordance with preferred embodiments of the present invention. In one preferred embodiment, the actuator comprises a linear electromagnetic ZNMJ actuator. The actuator includes a first permanent magnet and a second permanent magnet disposed closely adjacent the first permanent magnet so as to define an air gap therebetween. A coil is disposed in the air gap. An air moving member is connected to the coil. The moving member acts as a piston, and in one preferred form comprises a diaphragm. The coil experiences a concentrated magnetic flux field due to the arrangement of the poles of the two magnets. Accordingly, when an alternating current is applied to the coil, this causes the coil, and therefore the air moving member, to oscillate, thereby creating jets of air flow having an increased velocity (i.e., momentum output) over an otherwise conventional ZNMJ actuator incorporating only a single permanent magnet.

In preferred embodiments the ZNMJ actuator of the present invention further includes a keeper for supporting the two permanent magnets. The two permanent magnets are preferably rare earth magnets. In one embodiment, the first permanent magnet comprises an annular shape and the second permanent magnet being is disposed concentrically within an opening of the first permanent magnet. The poles of the two magnets are further arranged such that opposite poles are disposed on opposite sides of the air gap. This serves to minimize the leakage of the magnetic flux due to the forced parallel alignment of the magnetic moments across the air gap, thus increasing the density of the magnetic flux lines intercepted by the coil.

The actuator of the present invention, through its dual magnet configuration, provides increased momentum output for any given input voltage to its coil. The increased momentum output is further provided over a broad frequency spectrum. As additional benefits, the overall size and weight of the actuator are not significantly increased over conventional single magnet ZNMJ actuators.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view of a circular electromagnetic ZNMJ actuator in accordance with a preferred embodiment of the present invention;

FIG. 3 is a simplified cross sectional view of the actuator of FIG. 2 taken in accordance with section line 3—3 in FIG. 2;

FIG. 3A is a perspective view of a rod-like magnet which may be used in an alternative preferred embodiment of the actuator of FIGS. 2 and 3;

DETAILED DESCRIPTION OF THE PREFERRED EMBODIMENTS

Figure 1:
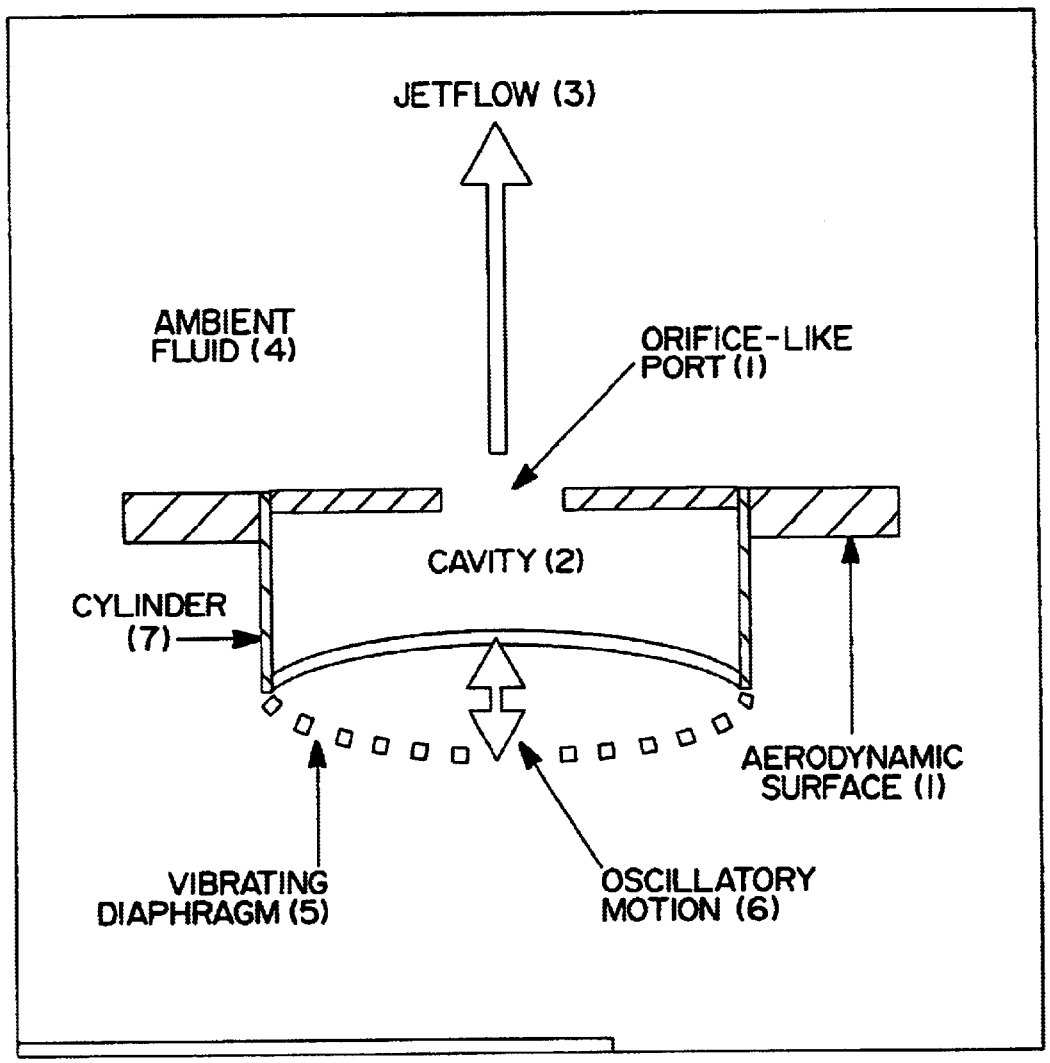
FIG. 1 is a highly simplified cross sectional view of a portion of a prior art ZNMJ actuator illustrating the principle of operation thereof.

The following description of the preferred embodiment(s) is merely exemplary in nature and is not intended to limit the invention, its application, or uses.

Referring to FIG. 2, there is shown a linear, electromagnetic zero net mass jet (ZNMJ) actuator 10 in accordance with a preferred embodiment of the present invention. The actuator 10 generally includes a piston 12, a bellows 14 and a bottom or base plate 16. The piston 12 may be formed from a variety of materials, but in one preferred form is comprised of carbon fiber with honeycomb sandwich construction. This construction provides a very stiff yet lightweight structure which are ideal characteristics for the piston 12. It will be appreciated, however, that the piston 12, as well as the base plate 16, could each be formed from a composite, from aluminum or any other structurally stiff but relatively lightweight material. The bellows 14 is preferably formed from fiberglass impregnated with resin to provide the flexibility needed to accommodate movement of the piston 12 relative to the base plate 16. An electrical cable 18 having two electrical leads 20 and 22 is fed through a slot 24 formed in the piston 12.

It will be appreciated immediately that the actuator 10, while shown as a generally circular shaped device, could comprise a variety of shapes. Accordingly, the illustration of the actuator 10 as a circular apparatus is merely meant for illustrative purposes. Also, while the actuator has been described as a "linear" actuator, it will be appreciated that the principles of the present invention are equally applicable to various other forms of actuators.

The bellows 14 is secured at its upper end 14a to a lower edge 12a of the piston 12 by a suitable means, such as a silicon adhesive. Similarly, a lower edge 14b of the bellows 14 is secured to an upper surface 16a of the base plate 16 via an adhesive or any other suitable means.

Referring to FIG. 3, the internal construction of the actuator 10 can be seen. A principal feature of the actuator 10 is the use of a pair of permanent magnets 26 and 28. In this preferred embodiment, magnet 26 can be viewed as a "first" magnet and comprises an annular shape forming an opening. Permanent magnet 28 can be viewed as a "second" magnet also having an annular shape and being disposed concentrically within the opening of the first permanent magnet 26. The area between an outer surface of the second magnet 28 and the inner surface of the first magnet 26 forms an air gap 30. Positioned within the air gap 30 is a coil 32. The coil 32 comprises a coil former 34 on which a conductor 36 is wound. The coil former 34 is fixedly secured to the lower surface 12a of the piston 12 such that the entire coil 32 moves linearly up and down in the drawing of FIG. 3 as the piston 12 moves up and down.

With further reference to FIG. 3, the permanent magnets 26 and 28 preferably comprise rare earth magnets. They are further arranged such that opposite poles of the two magnets 26, 28 are aligned on opposite sides of the air gap 30. By this it is meant that the South pole of one of the magnets 26 and 28 is positioned adjacent one side of the air gap 30 while the North pole of the other magnet 26, 28 is positioned adjacent the opposite side of the air gap 30. The magnets 26 and 28 are supported by a keeper 38. The keeper 38 essentially forms a steel support which also functions to contain the flux field produced by the magnets within the actuator 10. It will also be appreciated that while the actuator of the present invention has been illustrated as including two annular magnets, that one or more pairs of elongated, linear, rod-like magnets could just as easily be incorporated to form the actuator 10. One such rod-like magnet is illustrated in FIG. 3A and designated by reference numeral 29. While magnet 29 is rectangular in cross-section, it could just as readily comprise a circular cross-sectional shape, or virtually any other cross-sectional shape.

It will be appreciated that the electromotive force (EMF) generated by the magnetic flux passing through the coil 32 is equal to the sum of the force components due to the magnetic flux passing through the steel core, keeper 38 and permanent magnets (26 or 28), plus the magnetic flux crossing the air gap 30. This can be expressed by the following equation:

$$emf = B_c * I_c / \mu_c + B_g * I_g / \mu_g \qquad \text{Equation 1}$$

In equation 1 above, $I_c$ and $I_g$ are the lengths of the paths for the flux through the magnet/keeper/core assembly of a conventional electromagnet and the air gap, respectively. It will be noted that $I_g$ is actually the width of the air gap. $B_c$ and $B_g$ are the magnetic flux densities in the magnet/keeper/core assembly and the air gap, respectively. The elements $\mu_c$ and $\mu_g$ are the permeabilities of the magnet/keeper/core assembly and the air gap, respectively. When expressed in terms of the total magnetic flux passing through the conventional electromagnet, equation 1 can be expressed by the following equation 2:

$$emf = \phi * \{I_c/(A_c * \mu_c) + I_g/(A_g * \mu_g)\} \quad \text{Equation 2}$$

In equation 2, for a conventional electromagnet, $\phi$ is the magnetic flux through the magnetic circuit and $A_c$ and $A_g$ are the effective cross sectional areas for the magnet/keeper/core assembly and the air gap, respectively. Equation 2 indicates that the EMF can be increased by increasing $\phi$, or by maximizing the term inside the brackets, or both. Unfortunately, to maximize the quantity inside the brackets, physical changes in the geometry of the electromagnet will be required. For example, increasing the length of the path, $I_c$, for the magnetic flux within the magnet/keeper/core assembly results in a physically larger electromagnet/actuator. Equation 2 also indicates that it is only necessary to increase $\phi$ if the physical characteristics (i.e., size and weight) of the electromagnet are to remain unchanged (e.g., use the same number of coil windings, the same length of air gap, etc.). The dual magnet 26, 28 arrangement of the present invention maximizes $\phi$, and thus the EMF of equation 2 to allow for increased displacement of the oscillating piston 12 for any given input voltage.

In operation, when an alternating current is applied via the conductors 20 and 22 to the coil 32, the highly concentrated flux field extending through the air gap 30 causes a rapid oscillating movement of the piston 12. The opposite polarity of the magnets 26 and 28 on opposite sides of the air gap 30 results in minimizing the leakage of the magnetic flux due to the forced parallel alignment of the magnetic moments across the air gap. This increases the density of the flux lines intercepted by the coil windings 36.

Accordingly, by increasing the strength of the flux field $\phi$ across the air gap 30, an even greater displacement of the piston 12 can be achieved for any given AC signal applied to the coil 32. This produces an increased momentum (i.e., velocity) of the piston 12 for any given input voltage.

Figure 4:
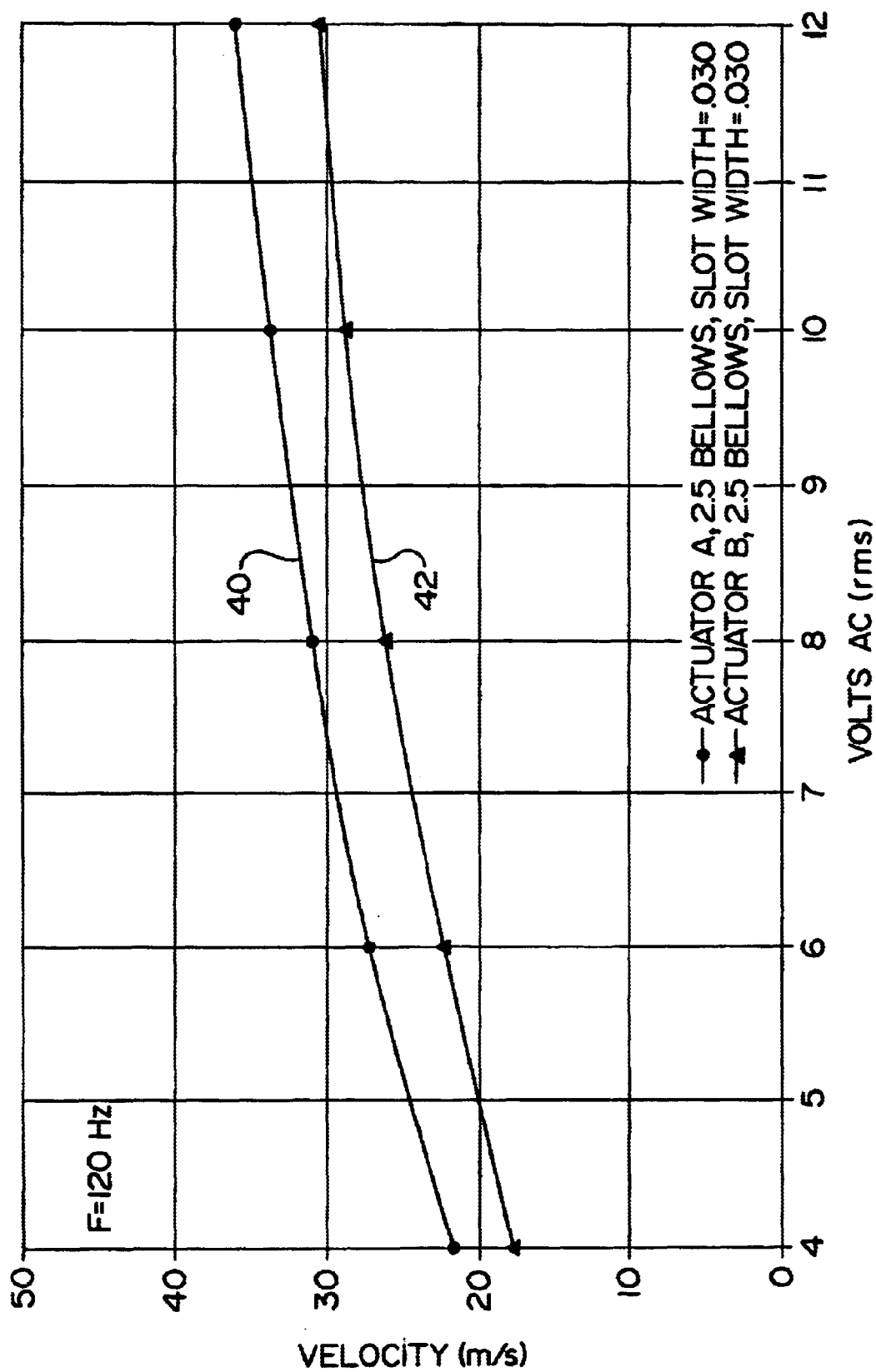
FIG. 4 is a graph illustrating the measured increase in velocity (i.e., momentum) of the piston of the ZNMJ actuator of the present invention as compared to the output of a conventional, single magnet ZNMJ actuator for a given operating frequency.

Referring briefly to FIG. 4, curve 40 represents the velocity of the air displaced by piston 12 of the actuator 10 at various input voltages, and at a given operating frequency, as compared to the velocity of air produced by a conventional, single magnet actuator, as represented by curve 42. It can be appreciated that the air velocity produced by the actuator 10 is higher than that of a conventional actuator for any given input voltage.

Figure 5:
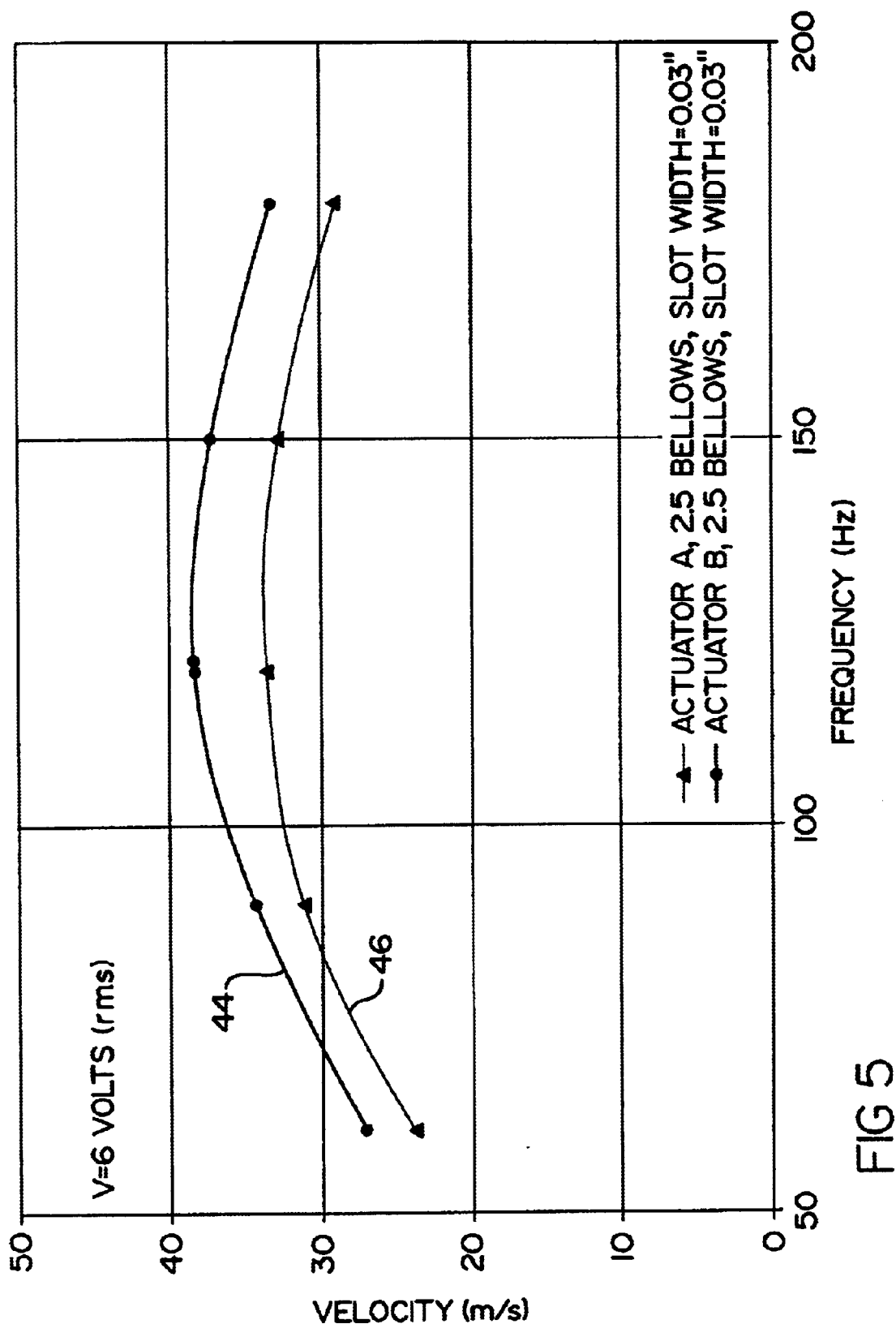
FIG. 5 is a graph of the measured velocity of the ZNMJ actuator of the present invention as compared to a conventional, single magnet actuator, over a predetermined frequency spectrum for a given input voltage.

Referring to FIG. 5, curve 44 illustrates the velocity of the air displaced by piston 12 of the actuator 10 of the present invention as compared to the velocity of air from a conventional, single magnet actuator, represented by curve 46, across a frequency spectrum. FIG. 5 illustrates that the velocity of air produced by the actuator 10 is better across a broad frequency spectrum than a conventional, single magnet ZNMJ actuator for a given input voltage.

The actuator 10 of the present invention thus provides a greater momentum output than conventional single magnet ZNMJ actuators without significantly increasing the complexity (weight, volume) or cost of construction thereof. Importantly, the increase in momentum output occurs uniformly over a range of input voltages as well as over a broad frequency spectrum.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electromagnetic zero net mass jet (ZNMJ) actuator, comprising:
    a first permanent magnet;
    a second permanent magnet disposed adjacent said first permanent magnet to define an air gap therebetween;
    an air moving member operatively coupled to a coil to thereby move with said coil in response to the flow of electrical current through said coil; and
    a bellows secured to said air moving member and encompassing said first permanent magnet, said second permanent magnet and said coil;
    whereby oscillating movement of said air moving member creates jets of air directed away from said actuator.

2. The actuator of claim 1, wherein said permanent magnets each comprises rare earth magnets.

3. The actuator of claim 1, further comprising a keeper for housing said first and second permanent magnets.

4. The actuator of claim 1, wherein each of said first and second permanent magnets comprises an annular shape, with said second permanent magnet being disposed concentrically within an opening of said first permanent magnet.

5. The actuator of claim 1, wherein each of said first and second permanent magnets comprises a rod-like shape.

6. The actuator of claim 1, wherein said air moving member comprises a diaphragm.

7. The actuator of claim 1, wherein said coil includes an annular coil form and an electrical conductor wound over said coil form.

8. The actuator of claim 1, wherein said first and second permanent magnets are arranged such that opposing magnetic poles of said magnets are disposed adjacent opposite sides of said air gap.

9. An electromagnetic zero net mass jet (ZNMJ) actuator, comprising:
    a first annular permanent magnet;
    a second annular permanent magnet disposed within a central opening in said first annular permanent magnet to define an air gap between an inner surface of said first annular permanent magnet and an outer surface of said second annular permanent magnet;
    a coil disposed within said air gap, said first and second annular permanent magnets providing a concentrated flux field across said coil;
    a diaphragm operatively coupled to said coil to thereby move with said coil in response to the flow of an oscillating electrical current through said coil; and
    a bellows secured to said diaphragm and encompassing said first annular magnet, said second annular magnet and said coil;
    whereby oscillating movement of said diaphragm creates jets of air directed away from said actuator.

10. The actuator of claim 9, further comprising a keeper for housing said first and second annular permanent magnets and said coil.

11. The actuator of claim 10, wherein said keeper is comprised of steel to minimize flux leakage.

12. The actuator of claim 9, wherein said coil comprises:
    a coil form; and
    an electrical conductor wound around said coil form.

13. A method for forming an electromagnetic zero net mass jet (ZNMJ) actuator, comprising:
    providing a first permanent magnet;
    providing a second permanent magnet disposed adjacent to said first permanent magnet to define an air gap therebetween;

disposing a coil in said air gap;

using a structure to support said permanent magnets;

disposing a bellows around said first permanent magnet, said second permanent magnet and said coil;

coupling an air moving member to said coil; and passing an oscillating electrical current through said coil to cause said coil to oscillate, and thereby cause said air moving member to create jets of air.

14. The method of claim 13, further comprising aligning said permanent magnets such that opposing poles are arranged on opposite sides of said air gap, to thereby provide a concentrated flux field across said air gap.

15. The method of claim 13, wherein the steps of providing said first and second permanent magnets comprises providing, first and second rod-like permanent magnets.

* * * * *